Oct. 14, 1941.  L. E. LA BRIE  2,258,855
BRAKE
Filed April 5, 1934  7 Sheets-Sheet 1
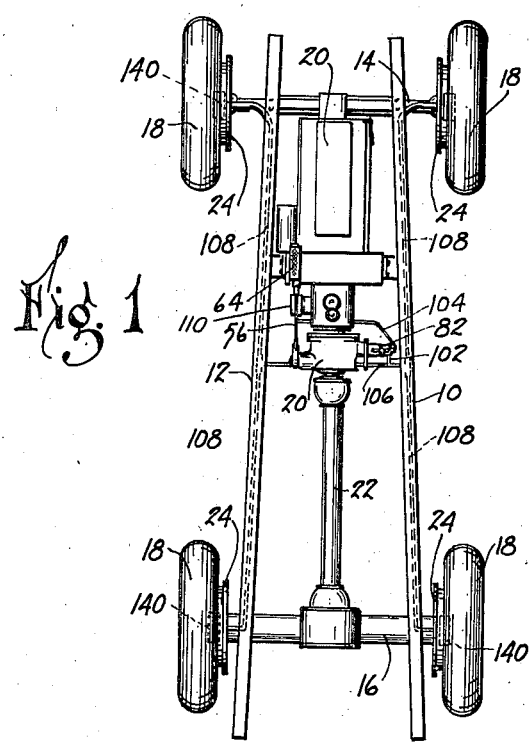
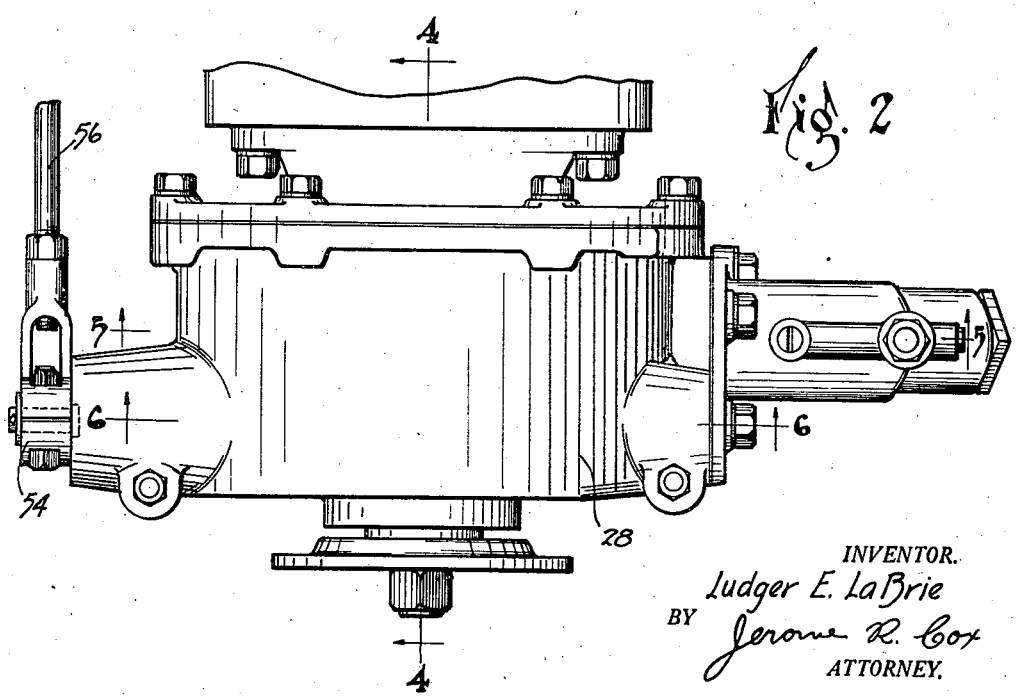
INVENTOR.
Ludger E. LaBrie
BY Jerome R. Cox
ATTORNEY.

Oct. 14, 1941.  L. E. LA BRIE  2,258,855
BRAKE
Filed April 5, 1934      7 Sheets-Sheet 2

INVENTOR.
Ludger E. LaBrie
BY Jerome R. Cox
ATTORNEY.

Oct. 14, 1941.  L. E. LA BRIE  2,258,855
BRAKE
Filed April 5, 1934  7 Sheets-Sheet 3

INVENTOR.
Ludger E. LaBrie
BY Jerome R. Cox
ATTORNEY.

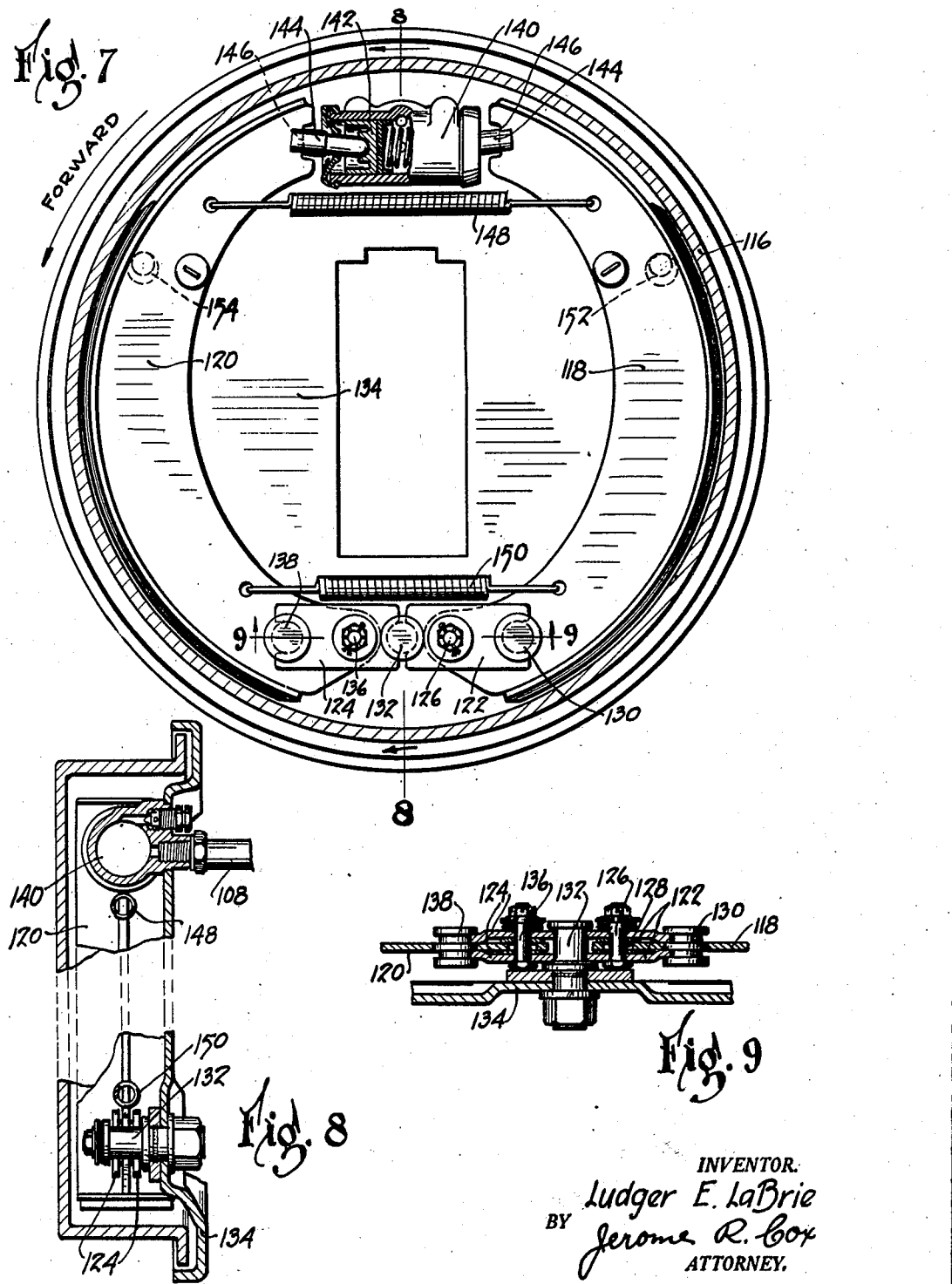

Oct. 14, 1941.  L. E. LA BRIE  2,258,855
BRAKE
Filed April 5, 1934  7 Sheets-Sheet 5

INVENTOR.
Ludger E. LaBrie
BY Jerome R. Cox
ATTORNEY.

Oct. 14, 1941.     L. E. LA BRIE     2,258,855
BRAKE
Filed April 5, 1934     7 Sheets-Sheet 6

INVENTOR.
Ludger E. LaBrie
BY Jerome R. Cox
ATTORNEY.

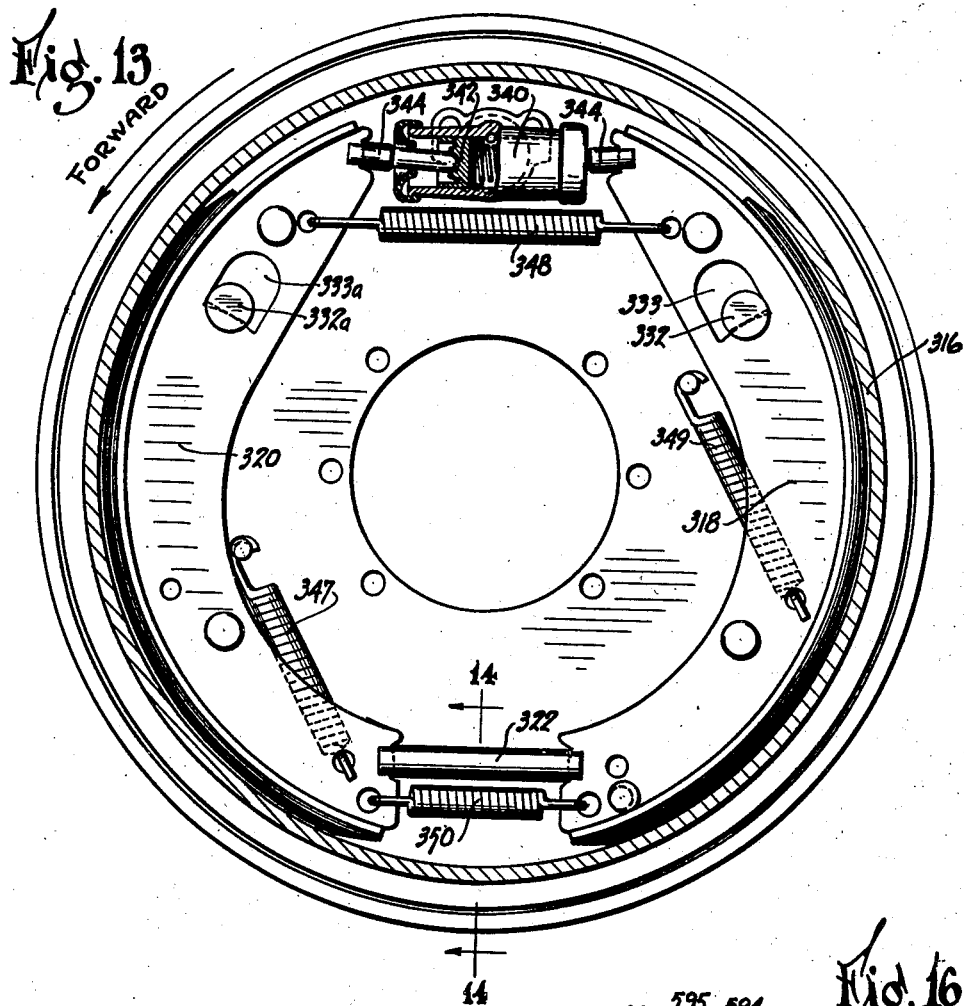
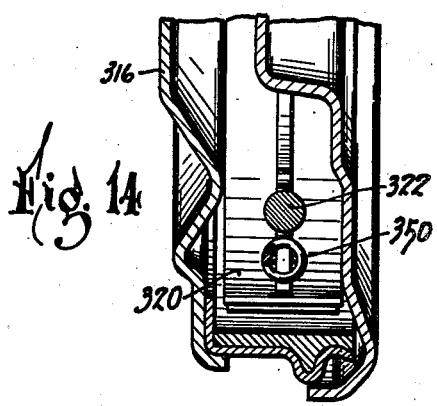
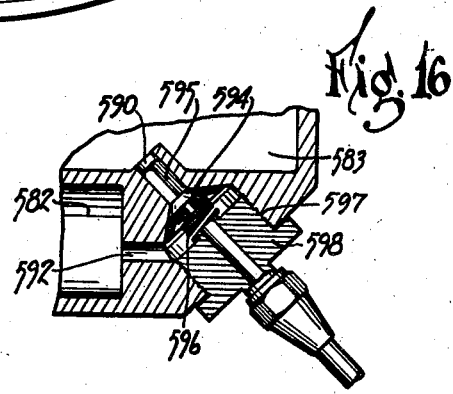

Patented Oct. 14, 1941

2,258,855

UNITED STATES PATENT OFFICE 2,258,855

BRAKE

Ludger E. La Brie, South Bend, Ind., assignor to Bendix Aviation Corporation, South Bend, Ind., a corporation of Delaware Application April 5, 1934, Serial No. 719,158

21 Claims. (Cl. 188—140)

This invention relates to brakes and more particularly to the type of brakes in which the inertia of the moving car is utilized for supplying power to apply the brakes and hold them applied.

One of the objects of the invention is to provide a braking system for an automobile, in which the movement of the automobile is converted when desired, into brake applying force and thereupon transmitted through a liquid medium to brakes positioned at the wheels of the automobile for applying said brakes.

A further object of the invention is to provide in such a device, means whereby in the event of failure of the wheel brakes of the hydraulic brake applying transmitting means, nevertheless the device will itself serve as a brake acting upon the transmission shaft of the vehicle.

A further object is to include in such a device, means reacting upon the pedal and effective to give to the operator a proportionate feel, indicating the brake applying force generated by the servo mechanism.

One of the features of the device, as illustrated, is the provision of stops by means of which a moving element of the servo mechanism is arrested, and whereby the servo mechanism itself acts as a brake for retarding the movement of the vehicle.

A further feature of the invention is the provision of a reaction cylinder in which liquid under pressure is forced and through which a proportion of the braking force generated reacts upon the foot pedal.

A further feature of the invention is the provision in combination with a brake applying system of the character described of a wheel brake designed to move out uniformly into contact with the drum and requiring no adjustment for lining wear.

Further objects and features of the invention will be apparent after a reading of the subjoined specification and claims and after a consideration of the accompanying drawing, in which:

Figure 1 is a plan view of a chassis of an automobile equipped with a servo brake mechanism and hydraulic brake applying transmitting arrangements designed in accordance with my invention;

Figure 2 is an enlarged fragmentary plan view of the servo unit which forms a portion of the structure shown in Figure 1;

Figure 7 is a view in vertical section and on an enlarged scale, of one of the brakes associated with the wheels of the automobile shown in Figure 1;

Figure 8 is a sectional view taken substantially on the line 8—8 of Figure 7;

Figure 9 is a sectional view taken substantially on the line 9—9 of Figure 7;

Figure 13 is a sectional view showing one of the brakes associated with the wheels of the vehicle illustrated in Figure 10;

Figure 14 is a sectional view taken substantially on the line 14—14 of Figure 13;

Figure 16 is a sectional view of a detail illustrating a modified form of valve adapted to be used with any one of the hydraulic master cylinders shown.

Figure 3:
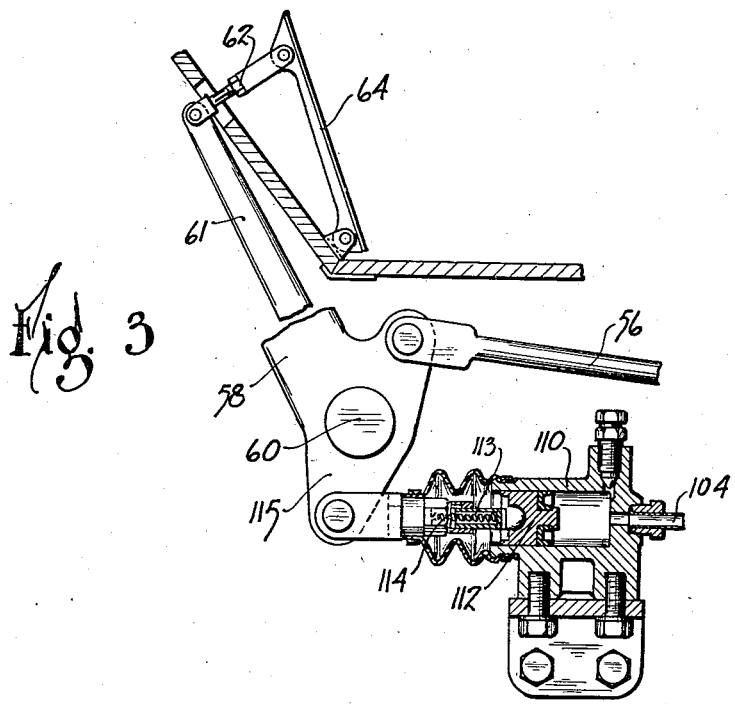
Figure 3 is a view partly in vertical section and partly in side elevation, showing the pedal and the reaction cylinder associated therewith.

Referring particularly to the embodiment of my invention shown in Figures 1-9 inclusive there is illustrated the chassis of an automobile including side rails 10 and 12, a front axle 14, a rear axle 16, road wheels 18, an engine 20 and a housing 22 which is arranged to surround the drive shaft of the automobile. Each of the road wheels 18 is equipped with a brake each generally designated 24, which may be of the type shown in detail in Figures 7-9 inclusive. Rearward of the engine 20, the clutch shaft 26 (see Figure 4) extends through a mechanical servo unit 28, which is arranged, when actuated by the pedal, to create brake applying force, which may be transmitted to the brakes.

Figure 4:
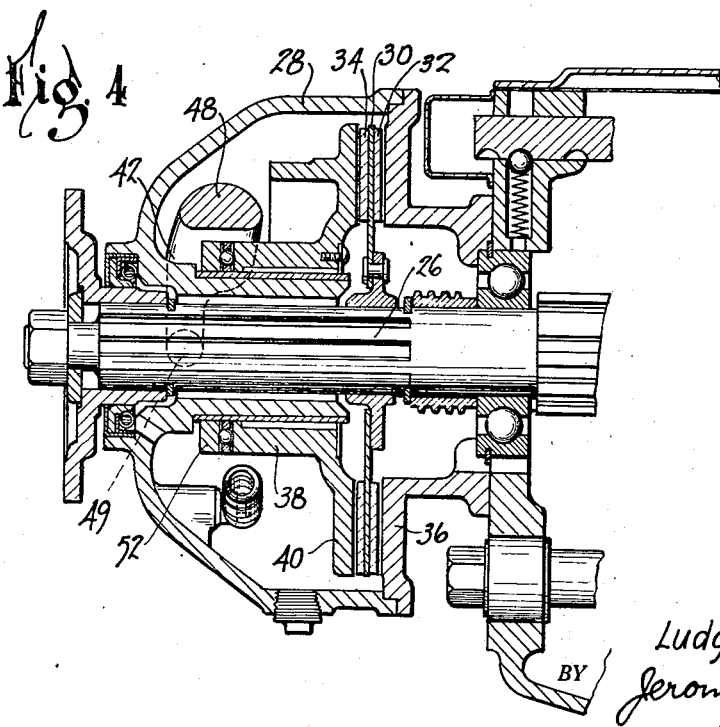
Figure 4 is a sectional view taken substantially on the line 4—4 of Figure 2.
Figure 5:
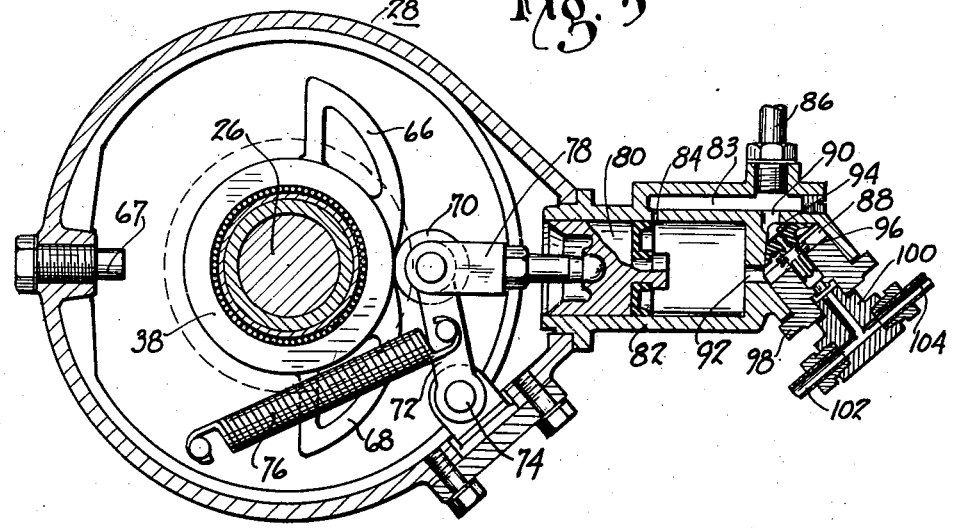
Figure 5 is a sectional view taken substantially on the line 5—5 of Figure 2.
Figure 6:
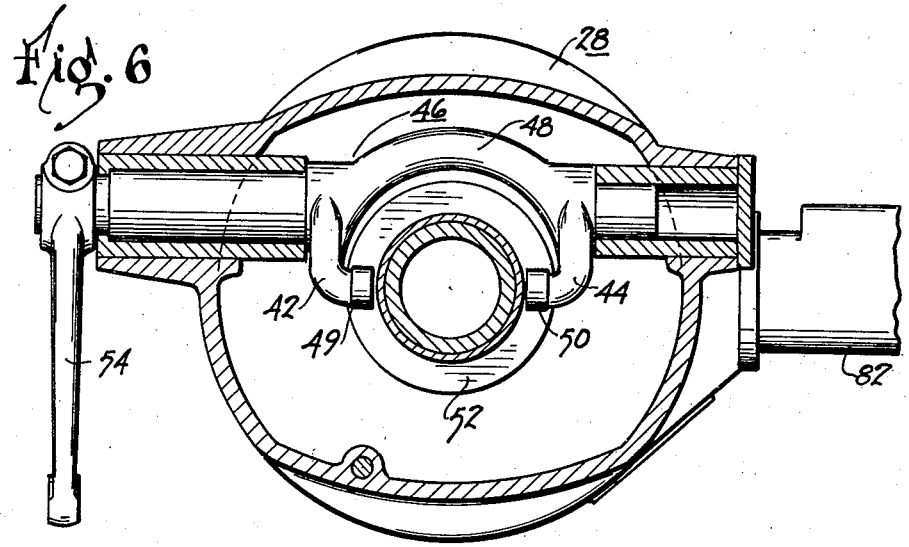
Figure 6 is a sectional view taken substantially on the line 6—6 of Figure 2.
Figure 10:
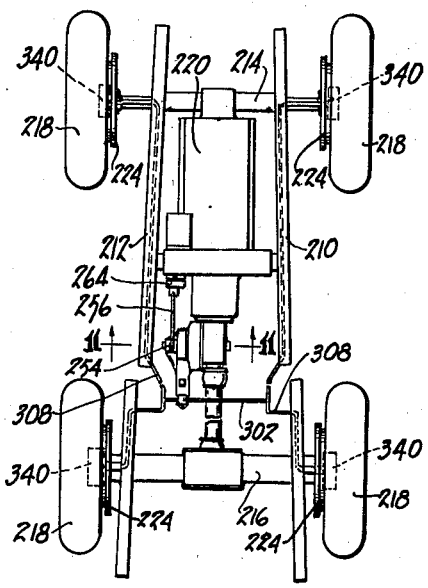
Figure 10 is a plan view of a chassis of an automobile illustrating a modified form of my invention.

The mechanical servo unit may be of the type disclosed in Figures 4, 5 and 6, and may include a disk 30 splined on the clutch shaft 26 so as to be free to move longitudinally of the shaft but so as to be forced to revolve with said shaft and provided with front and rear annular friction elements 32 and 34. The annular disks 32 and 34 are normally adapted to remain out of contact with any other element than the disk 30, but as later will be described, may at certain times contact with other portions of the unit. The disk 32 may be moved into contact with a fixed portion of the housing 36. A collar or sleeve 38 mounted on bearings and surrounding the shaft 26 is provided with an annular flange 40, which flange is adapted at times to be moved into contact with the friction element 34 and as a result of said contact, to move the element 32 into contact with the housing to exert a braking action. Also by reason of said contact the disk 30 is caused to rotate with the disk 34.

The means for moving the collar 38 into contact with the disk 34 may comprise a pair of fingers 42 and 44 pivoted substantially on the axis of a shaft generally designated 46 (see Figure 6). The shaft 46 includes a central bent portion 48 which carries the fingers 42 and 44. The fingers 42 and 44 carry contact lugs 49 and 50 adapted to contact with a rim 52 formed on the collar 38. The shaft 46 has secured thereto a lever 54 which is connected by means of a link 56 to one of the arms of a three-armed pedal lever 58 which is pivoted as at 60 on a fixed part of the chassis of the automobile. Another arm 61 of the lever 58, which arm is of relatively long length, is connected by an adjustable strut link 62 with a pivoted treadle 64.

When the automobile is moving and the flange 40 of the collar 38 is brought into contact with the revolving friction element 34, the motion of the friction element tends to rotate the flange 40 and the collar 38 and this rotation may be utilized to apply pressure to liquid in a master cylinder of a hydraulic brake system. As may be seen most clearly in Figure 5, the sleeve 38 is provided with a pair of outward extending cams 66 and 68, on which respectively a roller 70 is adapted to ride in each direction of rotation of the clutch shaft 26. The roller 70 is carried by a link 72 pivotally mounted at 74 on a fixed portion of the housing of the unit and is maintained in contact with the surface of one or the other of both of the cams 66 and 68 by means of a spring 76. The roller 70 is also pivotally connected to a link 78, which serves as a piston rod for a piston 80 positioned in a master cylinder 82. It will thus be seen that rotation of the sleeve 38 in either direction is effective to move the piston 80 forward in the cylinder 82 and thus exert pressure upon the liquid in said cylinder. A stop 67 is provided for limiting movement of the sleeve 38 and cams 66 and 68.

Means may be provided for maintaining a sufficient supply of liquid in the cylinder 82 at all times. The cylinder is formed with a liquid passage 83 which communicates through a relatively small port 84 with the interior of the cylinder at a position just in advance of the normal inactive position of the piston 80 (see Figure 5). The passage 83 is connected by a conduit 86 with a reservoir (not shown) having a reserve supply of liquid. The front portion of the cylinder 82 is provided with a chamber 88 which is connected by a port 90 with the passage 83 and by a port 92 with the main chamber of the cylinder. The chamber 88 is formed adjacent to the port 90 with a conical valve seat toward which a valve member 94 is normally urged by a spring 96. The valve member 94 prevents liquid from passing from the chamber 88 to the passage 83 and the reservoir through the port 90 but on the return stroke of the piston allows comparatively free replenishment of liquid from the reservoir to the chamber. The outer end of the chamber 88 is closed by a plug 98, within which is secured a T-shaped union 100, connecting the chamber with branch conduits 102 and 104. The conduit 102 is connected to a conduit 106 (see Figure 1) which in turn leads to four conduits 108 leading respectively to the individual wheel brakes.

The conduit 104 may supply pressure for giving a reaction or feel to the pedal. In order to create a reaction or feel upon the pedal proportionate to the braking force being developed by the mechanical servo, the conduit 104 may be connected to an auxiliary cylinder 110 provided with a piston 112 connected by a telescopic piston rod 114 with the third arm 115 of the pedal lever 58. The telescopic piston rod 114 is normally maintained in the extended position by the spring 113. The spring 113 during normal operation is extended but at a certain predetermined load is adapted to be collapsed so that additional movement of the foot pedal will not increase the brake pressure above the predetermined limit. The collapse of the spring will also prevent kick-back or similar discomfort to the operator due to sudden rises in pressure which might be caused by various conditions. Thus, whatever pressure is developed in the liquid system for applying the brakes is transmitted through the piston 112 to the pedal lever 58 and thus to the treadle 64. It is to be understood, of course, that the size of the piston 112 is small relative to the sizes of the pistons in the wheel cylinders and of the master cylinder piston 80.

The pressure of the fluid may be transmitted through the conduits 108 to the wheel cylinders of the brakes and there is utilized to apply the brakes for retarding the vehicle. The brakes of all of the wheels are substantially the same and may be as illustrated in Figures 7, 8 and 9. Therein is shown a brake drum 116 within which there is provided a pair of brake shoes 118 and 120 secured to pairs of links 122 and 124 respectively. Thus a bolt 126 passes through holes in the links 122 and through an oversized hole 128 in the end of the shoe 118. The shoe 118 is also provided with a double ended stud 130 against which arcual cutout portions formed on the ends of the links 122 bear. The links 122 at their opposite ends have arcual cutout portions which bear against an anchor post 132 secured to a backing plate 134. Similarly the shoe 120 is connected to the links 124 by the bolt 136 and by a double ended stud 138.

The opposite ends of the shoes 118 and 120 may be adapted to be spread apart by means of a wheel cylinder 140, to which the associated conduit 108 leads. The wheel cylinder 140 may be provided with pistons such as 142, which may act through piston rods such as 144 on the ends of the shoes 118 and 120. The ends of the piston rods 144 are slotted to fit over the ends of the shoes, the inner end of the slot normally bearing upon the rounded surface of a notch such as 146, the notch serving to position the piston rod.

The shoes are adapted to be returned to their normal released positions by means of return springs such as 148 and 150 and are positioned in the released position by means of adjustable stops such as 152 and 154.

In the embodiment of my invention illustrated in Figures 10, 11, 12, 13 and 14, the side rails 210 and 212 are supported on the axles 214 and 216 which are in turn supported by means of the road wheels 218. Each of the wheels 218 is provided with a brake such as 224 and the vehicle is driven by means of an engine 220.

Figure 11:
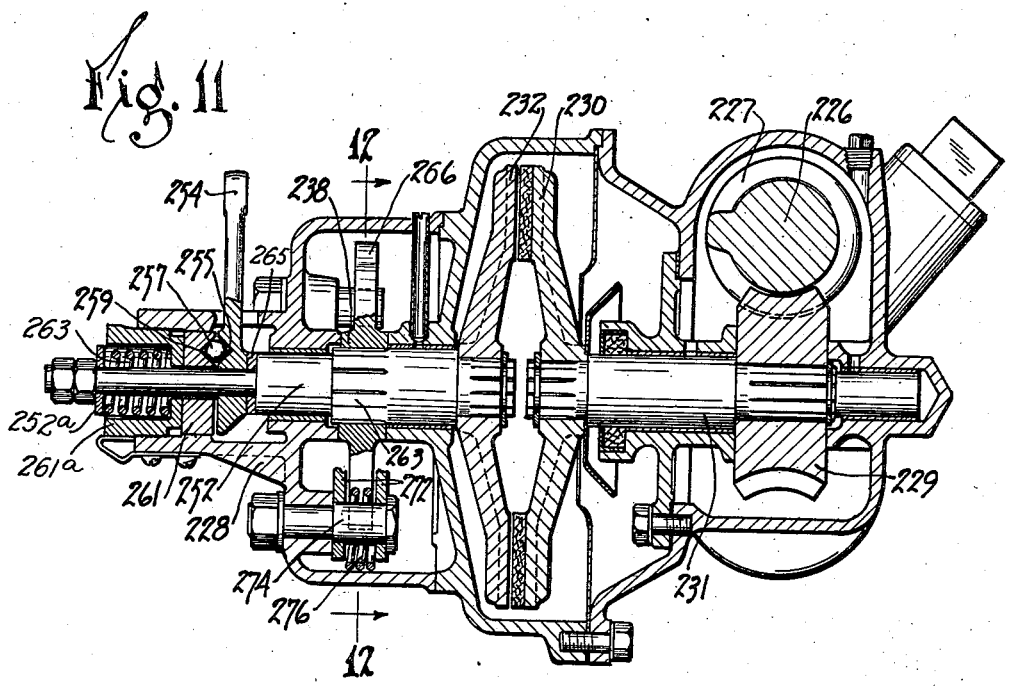
Figure 11 is a sectional view on an enlarged scale, taken substantially on the line 11—11 of Figure 10.

The engine is adapted to drive the road wheels through the clutch shaft 226 (see Figure 11). The clutch shaft is provided with a worm 227 which drives a worm gear 229 keyed upon a shaft 231. The shaft 231 carries a friction disk 230 with which a similar disk 232 is adapted at times to engage. The disk 232 is carried by a shaft 252 which is adapted to be rotated with the disk 232, and also is adapted to be moved longitudinally so as to move the disk 232 into engagement with the disk 230.

In order that the disk 232 may be moved into engagement with the disk 230 there is provided a lever 254 formed with a tapered notch 255 into which a ball 257 is adapted to partially extend. The ball 257 also partially extends into a similar notch 259 formed within a collar 261 secured to a stationary portion of the casing 228. The shaft 252 extends outward through the collar 261 and a spring 263 interposed between the sleeve 261a and the washer 252a serves normally to maintain the shaft 252 and the disk 232 in the position shown. A thrust washer 265 is interposed between the hub of the arm 254 and a shoulder on the shaft 252 to transfer the thrust of the arm 254 to the shaft. It will thus be seen that rotation of the lever 254 causes the ball 257 to ride in the tapered portion of the notches 255 and 259, thus separating the lever 254 and the collar 261 and forcing the shaft 252 to the right (as seen in Figure 11), thus causing the disk 232 to engage with the disk 230.

The lever 254 is connected by means of a link 256 to a foot pedal 264, and is thus operated.

Rotation of the disk 232 is adapted to apply the brakes. For this purpose the shaft 252 is provided with splines 263 and carried by the splines is a cam sleeve 238 provided with cams 266 and 268. These cams 266 and 268 are adapted to act upon a roller 270 mounted on a pair of links 272 pivoted at 274 and urged toward the position shown by means of a coil spring 276. The roller 270 is connected by means of a piston rod 278 with a piston 280 in a master cylinder 282. The cams 266 and 268 are normally held in the position shown and returned to said position by a spring 269. The master cylinder is provided with a reservoir 283 containing a supply of reserve liquid and the reservoir is connected to the master cylinder by means of a compensating port 284 and valve passages 290 and 292. Associated with the passages 290 and 292 is a valve 294, a spring 296 for the valve and a plug 298 threaded in an opening 297. The plug 298 is formed with an opening 299 which is connected by means of conduits such as 302 and 308 with wheel cylinders for the brakes at the wheels. The wheel cylinders are generally designated 340 and are shown most clearly in Figure 13.

In Figure 13 there is also shown full details of the brake used in illustration of my invention in this embodiment. The brake comprises a drum 316, shoes 318 and 320, a strut link 322 by means of which the lower ends of the shoes are maintained separated from each other, and a spring 350 maintaining the shoes in contact with the link 322. In the forward direction of rotation of the drum, the shoe 318 is adapted to anchor on an anchor bolt 332 which extends through a slot 333. The shoe 320 anchors upon the shoe 318 through the strut link 322. In the reverse direction of rotation the shoe 320 anchors upon the anchor bolt 332a which extends through the opening 333a and the shoe 318 anchors upon the shoe 320 through the strut link 322. Springs 347 and 349 normally maintain the shoes to the desired released position and insure that the initial application of force to apply the brake causes the shoe 320 to be first applied while the shoe 318 maintained in contact with its anchor. The spring 348 connected to the upper ends of both shoes 318 and 320 maintains the shoes out of contact with the drum when they are not being applied.

The wheel cylinder 340 is provided with a pair of pistons such as the piston 342 which act through piston rods 344 on the upper ends of the shoes in order to apply the shoes to the drum in order to exert braking force.

Figure 15:
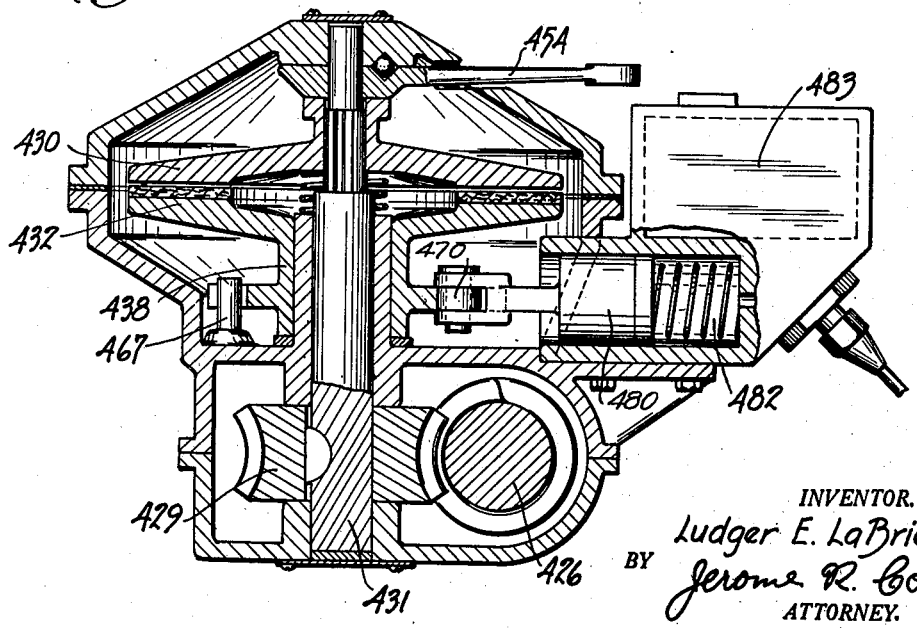
Figure 15 is a sectional view illustrating a modified form of servo unit.
Figure 12:
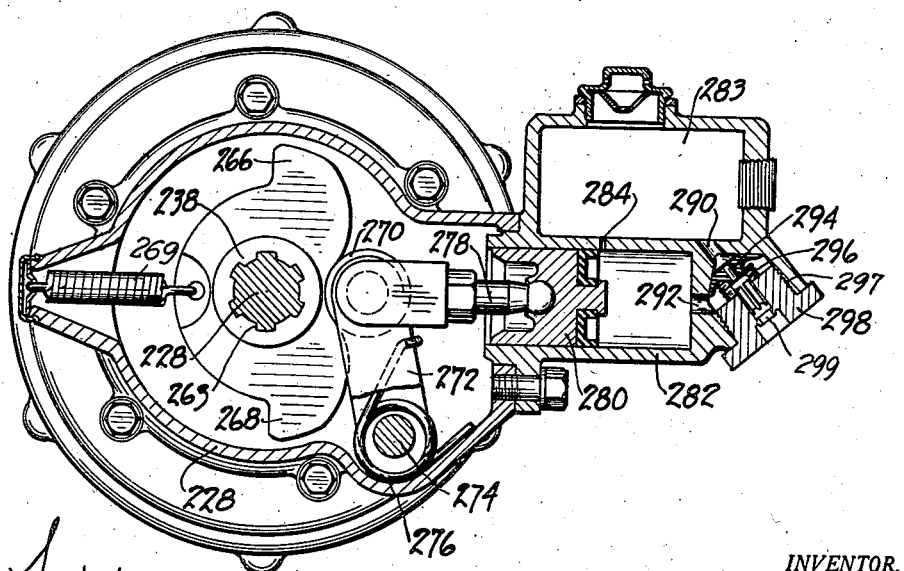
Figure 12 is a sectional view taken substantially on the line 12—12 of Figure 11.

In Figure 15 there is shown a servo unit and a hydraulic master cylinder similar in many respects to that shown in Figures 11 and 12 and similar numerals are used to designate similar parts with the addition of 200. It is to be noted, however, that the device shown in Figure 15 is provided with a stop 467 with which the ends of the cams formed on the sleeve 438 are adapted to contact. Moreover, the sleeve 438 is interposed between a worm gear 429 and the disk 432, and the disk 430 which is keyed to the shaft 431 is interposed between the disk 432 and the operating lever 454. The servo unit and hydraulic master cylinder of this figure are also provided with a master cylinder piston 480 and with a roller 470 arranged to contact with the cams formed on the sleeve 438.

In Figure 16 a slightly different form of valve is shown. Therein the master cylinder 582 is connected to the reservoir 583 by means of ports 590 and 592, the former being circular in cross section. The valve 594 is provided with a guide extension 595 which extends into the port 590 and is formed with a square cross section so that is maintained in contact with its anchor. The valve 594 is urged towards its seat by means of a spring 596 which bears at its opposite end upon the plug 598 secured in an opening 597.

It is believed that the operation of the several embodiments of my invention are so similar that the description of one will suffice for all. Depression of the foot pedal 64 operates through the link 56 and lever 54 to rotate the shaft 46. Thus the fingers 42 and 44 move the sleeve 52 and cause the disk 40 to contact with the friction disk 30. This causes a rotation of the disk 40 and movement of the cams 66 and 68 in one direction or the other. The movement of the cams acts upon the roller 70 to exert pressure upon the piston 80 and thus force liquid through the conduits 100, 102, 104, 106 and 108. The pressure forced through the conduit 108 is transmitted to the cylinder 140 and thus spreads the pistons 142 to cause the shoes 118 and 120 to contact with the drum 116. Inasmuch as the shoes anchor upon the bolt 132, this retards rotation of the brake drums and consequently retards the movement of the vehicle. The pressure transmitted through the conduit 104 acts upon the piston 112 and thus transmits a portion of the brake applying force back to the pedal 64 to give the operator a feel of the braking operation. In the event that there should be any failure in the hydraulic brake transmitting system, continued rotation of the disk 40 causes one or the other of the cams 66 and 68 to contact with the stop 67, thus providing a transmission brake through which the vehicle may be stopped.

In the form of my invention shown in Figures 10 to 14 inclusive the operation is substantially the same except that longitudinal movement of the shaft 252 is accomplished by means of movement of the ball 257 in the grooves 255 and 259, and furthermore, the friction disks of the servo mechanism, instead of being driven directly by the drive shaft, are driven through a reduction gear system. In the device as illustrated I have shown no reaction means corresponding to the cylinder 110 shown in Figures 1 and 3.

In the form of my invention shown in Figure 15 a stop is provided for a purpose similar to that described in connection with the first embodiment while the friction disk is driven through a worm reduction rather than directly by the drive shaft.

It is to be understood that the above-described embodiments of my invention are for the purposes of illustration only and various changes may be made therein without departing from the spirit and scope of the invention.

I claim:

1. In combination a brake, a hydraulic system for applying said brake including a master cylinder, a mechanical servo unit for applying pressure to said master cylinder, a pedal for operating said mechanical servo unit, and an auxiliary cylinder connected to said panel and to said hydraulic system for causing a reaction upon said pedal proportionate to the applying force developed by said mechanical servo unit.

2. In combination a brake, a hydraulic system for applying said brake including a master cylinder and a piston in said master cylinder, a shaft driven by the motor of said vehicle, a sleeve surrounding said shaft and provided with a pair of cams, friction means for connecting said sleeve to said shaft, a pivoted link, a roller mounted on said pivoted link with which said cams are adapted to contact, and a piston rod connecting said roller to said piston.

3. In a braking system, a hydraulic master cylinder, a power device for applying pressure to the fluid in said master cylinder, a foot pedal lever having an arm to which force is applied by the foot of the operator, an arm connected to said power device for actuating said device for applying pressure to the fluid in the master cylinder, and a third arm, an auxiliary cylinder, a piston in said auxiliary cylinder, a connection between said piston and said third arm, and fluid connections between said auxiliary cylinder and said master cylinder.

4. A brake system comprising an actuating pedal, a mechanical servo unit operated by said pedal, and reactance means resiliently connected to said pedal.

5. A hydraulic brake system comprising a mechanical servo actuated master cylinder, an actuating pedal for the servo unit, a reactance piston actuated by the fluid pressure of the system, and resilient means connecting the reactance piston to the foot pedal.

6. In combination a wheel brake; a driven shaft; a mechanical servo unit; means for actuating said mechanical servo unit from said driven shaft including a stub shaft, an offset element secured to said stub shaft, a pair of fingers secured to said element, a sleeve slidably mounted in relation to said driven shaft with which said fingers are adapted to contact and means for rotating said stub shaft; a hydraulic master cylinder; means for actuating said master cylinder responsive to actuation of said mechanical servo unit; a wheel cylinder for operating said brake; and conduits connecting said master cylinder and said wheel cylinder.

7. A brake comprising a master cylinder, a wheel cylinder, connections between said master cylinder and said wheel cylinder, a wheel brake arranged to be operated by said wheel cylinder, a pair of friction disks, one of which is adapted to be moved into contact with the other, means for moving said disks into contact including a pair of relatively movable members each of which is formed with a tapered slot and a ball positioned in said slot, means for continuously driving one of said disks, a pair of cams associated with the other said disk, a piston for said master cylinder, and means for operating said piston responsive to movement of said means.

8. A hydraulic brake system comprising a hydraulic master cylinder, a mechanical servo unit for actuating said master cylinder, an actuating pedal for said mechanical servo unit, fluid connections from said master cylinder, wheel cylinders to which said fluid connections extend, wheel brakes arranged to be actuated by said wheel cylinders, an auxiliary cylinder also connected to said fluid connections, a piston in said auxiliary cylinder, and mechanical connections from said piston to said actuating pedal.

9. For use in a hydraulic braking system, a master cylinder and reservoir unit including a reservoir chamber, a cylinder chamber and a forward chamber connected by a port with the reservoir chamber and by another port with the cylinder chamber and having a threaded opening separate from these ports, a tapered valve within the forward chamber adapted at times to close the port leading to said reservoir, a spring normally urging said valve towards its seat to close said first named port, and a threaded plug secured in said forward opening on which said spring bears, said threaded plug being formed with an opening leading to the brakes.

10. In a servo mechanism, in combination, a rotatable driving element, a rotatably but normally stationary driven element, means for effecting frictional engagement between said elements whereby to cause rotational movement of said driven element, a cam member having a peripheral cam face movable with said driven element, a plunger cooperable with said cam face and reciprocable under the influence thereof, and stop means for limiting rotational movement of said cam member.

11. In a servo mechanism, in combination, a housing, a rotatable driving member, a rotatable but normally stationary driven member within said housing, means for effecting frictional engagement between said members whereby to cause partial rotation of said driven member, a cam element within said casing drivingly connected to said driven member and having a peripheral cam face, an axially movable plunger projecting through a wall of said housing and co-operating with said cam face whereby to receive axial movement therefrom, and a stop on said cam member co-operating with said housing to limit the rotational movement of said cam member.

12. In a power brake, a power driven rotatable member, a device for frictionally engaging said member, means actuated by the torque derived from the said device for applying a brake independently thereof, means for engaging said device with the rotatable member, an operator operated member for applying pressure to said engaging means, and means comprising a reaction connection between the brake applying means and the operator operated member separate from the engaging means whereby the developed force of the applying means may be proportional to that of said engaging means.

13. In a mechanical servo brake, a power driven rotatable member, a device for frictionally engaging said member, a rockable support for said device, means on said support for transmitting torque in either direction to operate a brake, means for engaging the device with the power driven member, and an operator operated member for applying force to the engaging means and having a reaction connection with the torque transmitting means separate from the engaging means and subject to the transmitted torque.

14. In a servo mechanism, in combination, a rotatable driving element, a rotatably but normally stationary driven element, means for effecting frictional engagement between said elements whereby to cause rotational movement of said driven element, a cam member having a peripheral cam face movable with said driven element, a plunger cooperable with said cam face and reciprocable under the influence thereof, a wheel brake, means for transmitting brake applying force from said plunger to said wheel brake, and stop means for limiting rotational movement of said cam member whereby said frictional engagement between said elements serves as an auxiliary brake in the event of failure of said wheel brake.

15. In a servo mechanism, in combination, a housing, a rotatable driving member, a rotatable but normally stationary driven member within said housing, means for effecting frictional engagement between said members whereby to cause partial rotation of said driven member, a cam element within said casing drivingly connected to said driven member and having a peripheral cam face, an axially movable plunger projecting through a wall of said housing and cooperating with said cam face whereby to receive axial movement therefrom, a wheel brake, means for transmitting brake applying movement from said plunger to said wheel brake, and a stop on said cam member cooperating with said housing to limit the rotational movement of said cam member whereby said frictional engagement between said members serves as an auxiliary brake in case of failure.

16. The combination with a braking system for motor vehicles including a mechanical servo mechanism comprising driving and driven frictionally engageable members, a wheel brake mechanism, a fluid connection between said servo mechanism and said wheel brake mechanism, and a control pedal for effecting frictional engagement of said members of said servo mechanism, of means for deriving from the pressure in said fluid connection resistance to operating movement of said control pedal in direct proportion to the pressure in said fluid connection.

17. The combination with a hydraulic braking system for motor vehicles including a mechanical servo mechanism for actuating said hydraulic braking system and comprising driving and driven frictionally engageable members, and a control pedal for effecting frictional engagement of said members in said servo mechanism, of means exclusive of said engageable members subject to the pressure in said hydraulic braking system directly opposing actuating movement of said control pedal.

18. The combination with a hydraulic braking system, a mechanical servo mechanism including frictionally engageable driving and driven members for operating said braking system, and a control pedal for effecting frictional engagement of said members of said servo mechanism, of a member having a movable wall, a connection separate from said engageable members between said movable wall and said control pedal, of means for subjecting said movable wall to the pressure simultaneously existing in said hydraulic braking system.

19. The combination with a hydraulic braking system, a mechanical servo mechanism including frictionally engageable driving and driven members for actuating said hydraulic braking system, and a control pedal for effecting frictional engagement of said members of said servo mechanism, of a piston, means separate from said engageable members operatively connecting said piston and said control pedal, of means for subjecting said piston to the pressure simultaneously existing in said hydraulic braking system whereby to cause said piston to oppose actuating movements of said control pedal in direct proportion to the pressure in said hydraulic braking system.

20. In a power brake, a power driven rotatable member, a device for frictionally engaging said member, means for transmitting the torque derived from the device to apply a brake independently thereof, means for engaging said device with the rotatable member, an operator operated member, a connection between the latter member and said engaging means for applying pressure thereto, and means comprising a reaction connection between the torque transmitting means and the operator operated member separate from the engaging means whereby the developed force of the transmitting means may be proportional to that of said engaging means.

21. In a mechanical servo brake, a power driven rotatable member, a device for frictionally engaging said member, a rockable support for said device, means on said support for transmitting torque in either direction to operate a brake, means for engaging the device with the power driven member, an operator operated member, a connection between the latter member and said engaging means for applying pressure thereto, and a reaction connection between the operator operated member and the torque transmitting means separate from the engaging means and subject to the transmitted torque whereby the developed force of the transmitting means is proportional to the reaction force on the operator operated member.

LUDGER E. LA BRIE.